J. T. DOVI.
FRUIT PRESS.
APPLICATION FILED JULY 5, 1917.
1,312,313.
Patented Aug. 5, 1919.
2 SHEETS—SHEET 2.
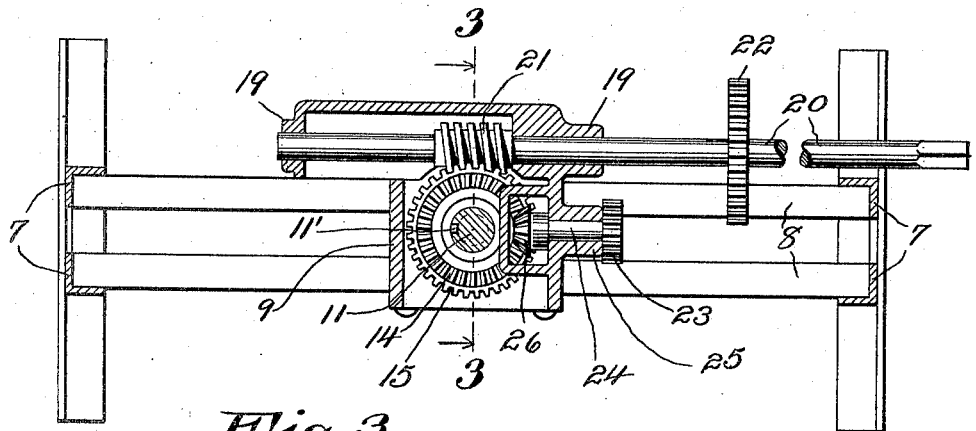
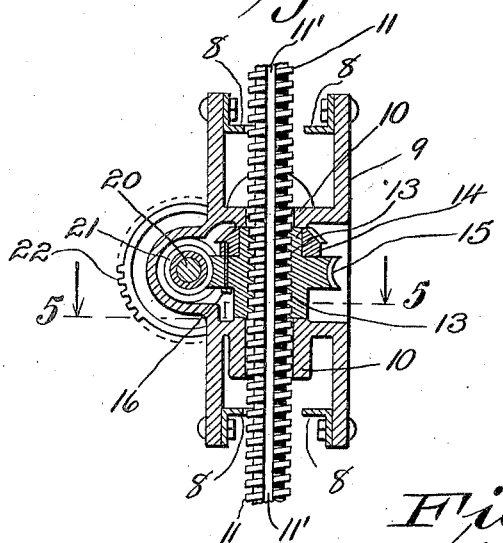
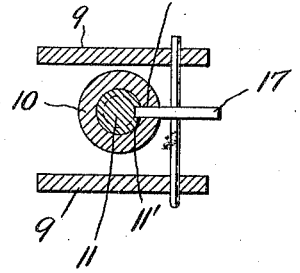
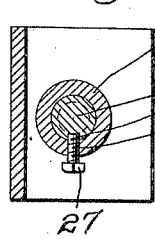

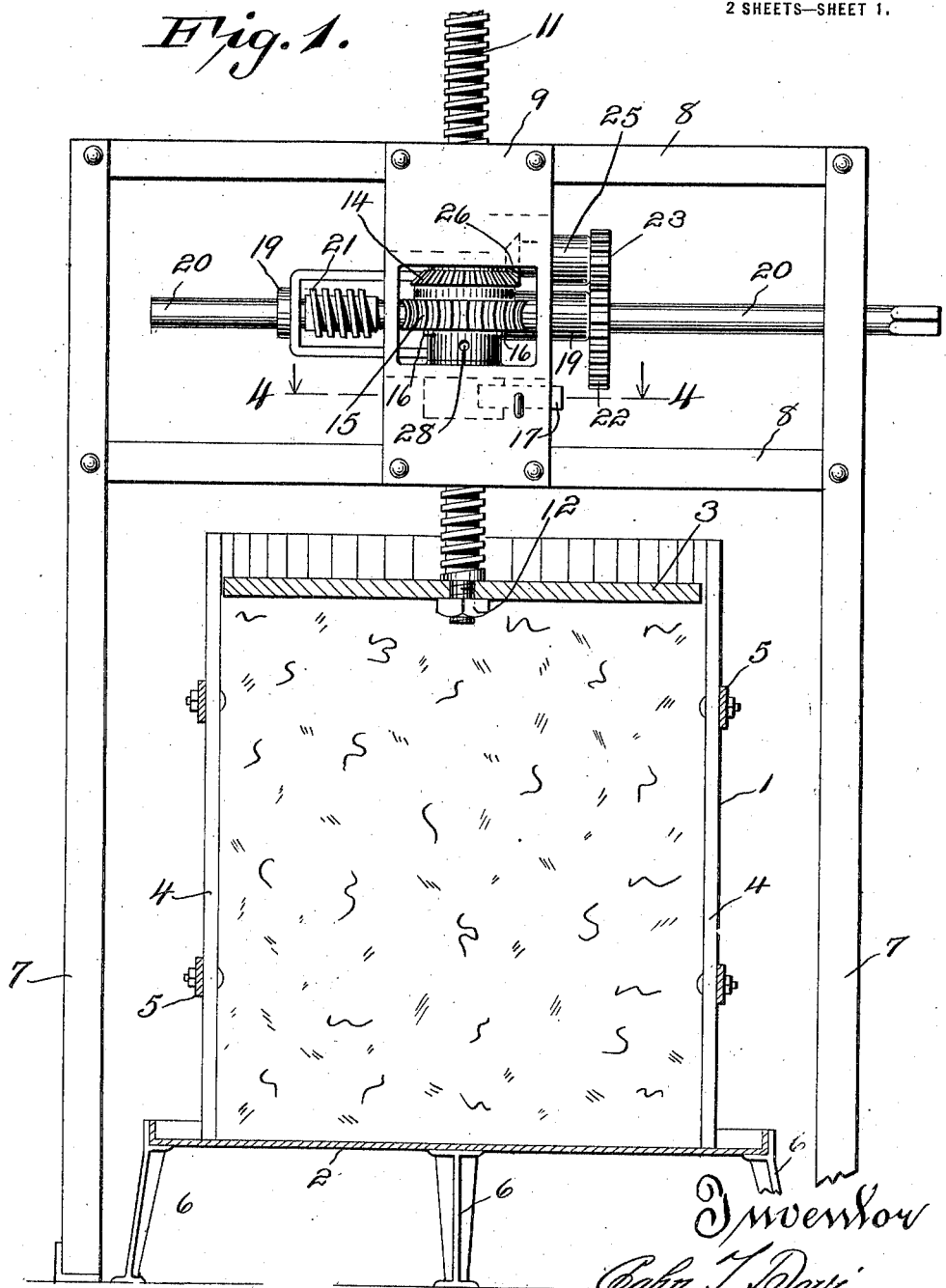

UNITED STATES PATENT OFFICE.

JOHN T. DOVI, OF MILWAUKEE, WISCONSIN.

FRUIT-PRESS.

1,312,313. Specification of Letters Patent. Patented Aug. 5, 1919.

Application filed July 5, 1917. Serial No. 178,564.

*To all whom it may concern:*

Be it known that I, JOHN T. DOVI, a citizen of the United States, and resident of Milwaukee, in the county of Milwaukee and State of Wisconsin, have invented certain new and useful Improvements in Fruit-Presses; and I do hereby declare that the following is a full, clear, and exact description thereof.

My invention relates to certain new and useful improvements in fruit presses, particularly those which are equally well adapted for the pressing of grapes, apples, or any other class of fruit.

The primary object of the invention is to provide a fruit press having suitable transmission means for providing two working speeds therefor, in order to accommodate the same for use with any character of fruit.

An additional object is to simplify and otherwise improve the construction of devices of this character whereby they may be much more easily operated.

With the above and other objects in view which will appear as the description proceeds, my invention resides in the novel construction, combination and arrangement of parts substantially as hereinafter described and particularly defined by the appended claim, it being understood that such changes in the precise embodiment thereof may be made as come within the scope of the claim.

In the accompanying drawings I have illustrated one complete example of the physical embodiment of my invention constructed according to the best mode I have so far devised for the practical application of the principles thereof, in which:

Figure 1 is a central sectional view through a fruit press with my improved operating mechanism connected therewith, the operating mechanism being shown in elevation.

Fig. 2 is a sectional view through the supporting frame with the transmission gears in elevation.

Fig. 3 is a vertical sectional view through Fig. 2 as indicated by line 3—3 thereof.

Fig. 4 is a transverse sectional view taken on the line 4—4 of Fig. 1, and

Fig. 5 is a sectional view taken on line 5—5 of Fig. 3.

In its preferred embodiment as shown in the accompanying drawings, wherein similar references designate like parts in all the views, the invention consists broadly of a fruit receptacle 1 mounted on a suitable base 2 and means for moving a follower head 3 toward and away from said base at varying speeds.

The receptacle 1 is open at its opposite ends and is formed of a plurality of vertically disposed slats or staves 4, the same being arranged annularly with respect to each other and held in position by two or more annular bands 5. Each of the staves 4 is spaced from the next adjacent stave a slight distance to permit the juices which are pressed from the mass of fruit to flow therebetween. The lower ends of the staves rest upon the base 2 which is in the form of a pan, and said fruit juices collect therein or run out through a suitable spout, not shown. If it is necessary or desirable the base pan 2 may be supported from the floor by means of feet 6 of any preferred design.

A pair of standards 7 are disposed at opposite sides of the receptacle 1 and have connecting their upper ends and passing transversely across the center of said receptacle two vertically spaced pairs of suitable braces 8 forming a supporting frame for the operating mechanisms. Secured to the members 8 intermediate the ends thereof is a gear case 9, the vertically projecting pairs of spaced flanges of which are secured to the braces 8. The top and bottom of the gear case proper have bearings 10 formed thereon for a vertically movable worm shaft 11 having its lower end fixed to the follower head 3 by means of any suitable fastenings 12.

This worm shaft 11 passes through and engages threads formed in the bore 13 of a worm wheel 15 disposed between the bearings 10 within the gear case 9, and mounted on the shank of the worm gear and secured thereto by means of suitable fastenings 16 is a bevel gear 14. The worm shaft 11, when operating the presser, is held from rotating movement by means of a pivoted trigger finger 17 adapted to have its inner end passed through a slot 18 in the lowermost bearing 10 to engage a keyway 11′ extending through the entire length of the worm shaft 11, and when the gears 14 and 15 are revolved by means later described, the worm shaft 11 will be moved vertically, as will be obvious.

Transversely journaled in bearings 19 formed in the opposite ends of the horizontally disposed, laterally extending supplemental gear housing which is constructed integrally with the gear case proper 9 is a shaft 20 adapted to be either manually or otherwise rotated and slidably splined to said shaft 20 and located within said supplemental gear housing is a worm gear 21 adapted to selectively mesh with the teeth of worm gear 15. A gear wheel 22 similarly mounted on the shaft 20 is adapted to selectively mesh with a smaller gear wheel 23 fixed to the outer end of a stub or counter shaft 24 journaled in bearings 25 parallel to said shaft 20 and carrying at its inner end a beveled gear 26 in mesh at all times with the beveled gear 14. When it is desired to press a light fruit, such as grapes, the worm gear 21 is disengaged from the worm wheel 15 and the gear wheel 22 is slid along shaft 20 to engage gear wheel 23 as depicted in Fig. 1 to thus provide for a faster operation of the device, but when it is desired to provide a slower movement of the head 3, the gear wheel 22 is disengaged from gear wheel 23 and the worm gear 21 is meshed with the worm wheel 15 as illustrated in Fig. 2.

When it is desired to give the worm shaft 11 a rotating movement, the trigger 17 is disengaged from the slot 11' and a set screw 27 is passed through a threaded aperture 28 in the shank of the worm wheel 15 to engage said slot 11' as shown in Fig. 5.

From the foregoing description taken in connection with the accompanying drawings, it will be seen that a very simply constructed fruit press has been produced which can easily be operated to press the fruit contained therein by the revolving of shaft 20.

I claim:

In a press, a pressing element including a feed screw having a longitudinal keyway, means for either shifting the element to or from pressing position without rotation at either one of two selective speeds or rotating said element without moving the same to or from the latter position at either one of said selective speeds, the first mentioned means comprising a pivoted relatively stationary dog slidably engaged in said keyway, a worm wheel having its bore threaded for engagement with the threads of the feed screw, a shiftable drive shaft slidably journaled substantially at right angles to the feed screw, a worm on the drive shaft intermittently engageable with the worm wheel, said worm and worm wheel constituting means for shifting the feed screw at one speed, the other speed being imparted by a bevel gear fixed to said worm wheel, an auxiliary drive shaft journaled substantially at right angles to the feed screw and parallel to the other drive shaft, a bevel gear on said auxiliary shaft and meshed with the other bevel gear, a pinion fixed to the auxiliary shaft, and a spur gear secured to the drive shaft and intermittently engageable with the pinion upon shifting said drive shaft, the second mentioned means comprising the foregoing element and means for locking the worm wheel to the feed screw, the pivoted dog being swung out of the keyway whereby the pressing element may be rotated at one speed by the rotation of the drive shaft and the engagement of the worm and worm wheel, and a second speed when the pinion and spur gear are enmesh.

In testimony that I claim the foregoing I have hereunto set my hand at Milwaukee, in the county of Milwaukee and State of Wisconsin.

JOHN T. DOVI.

Copies of this patent may be obtained for five cents each, by addressing the "Commissioner of Patents, Washington, D. C."